(12) United States Patent
Nakajima

(10) Patent No.: US 7,652,708 B2
(45) Date of Patent: Jan. 26, 2010

(54) SOLID-STATE IMAGING APPARATUS

(75) Inventor: Shinichi Nakajima, Koganei (JP)

(73) Assignee: Olympus Corporation, Tokyo (JP)

( * ) Notice: Subject to any disclaimer, the term of this patent is extended or adjusted under 35 U.S.C. 154(b) by 376 days.

(21) Appl. No.: 11/779,460

(22) Filed: Jul. 18, 2007

(65) Prior Publication Data

US 2008/0018760 A1  Jan. 24, 2008

(30) Foreign Application Priority Data

Jul. 19, 2006 (JP) ............................. 2006-196645

(51) Int. Cl.
*H04N 3/14* (2006.01)
*H04N 5/335* (2006.01)
(52) U.S. Cl. .................. 348/308; 348/294; 348/296; 348/302
(58) Field of Classification Search .................. 348/301
See application file for complete search history.

(56) References Cited

U.S. PATENT DOCUMENTS

| 5,086,344 | A * | 2/1992 | D'Luna et al. ............... 348/250 |
| 7,271,835 | B2 * | 9/2007 | Iizuka et al. ................ 348/314 |
| 7,427,736 | B2 * | 9/2008 | Xu et al. .................... 250/208.1 |
| 2001/0015831 | A1 * | 8/2001 | Lauxtermann et al. ...... 358/474 |
| 2003/0112473 | A1 * | 6/2003 | Robins et al. ............... 358/463 |
| 2003/0128285 | A1 * | 7/2003 | Itoh ........................... 348/246 |
| 2006/0082675 | A1 * | 4/2006 | McGarvey et al. .......... 348/362 |

OTHER PUBLICATIONS

"Basics and Application of CCD/MOS Image Sensor"; CMOS pp. 193-194.

* cited by examiner

*Primary Examiner*—Sinh Tran
*Assistant Examiner*—Jason Flohre
(74) *Attorney, Agent, or Firm*—Westerman, Hattori, Daniels & Adrian, LLP

(57) ABSTRACT

A solid-state imaging apparatus includes: a pixel section having two-dimensionally arrayed pixels each having a photoelectric conversion means, a memory means for storing photoelectric conversion signal, a transfer means for transferring the photoelectric conversion signal to the memory means, a reset means for resetting the memory means, a discharge means for discharging photoelectric conversion signal accumulated, a read means for reading photoelectric conversion signal; an A/D converter; a noise suppressing means for suppressing noise of signal from said A/D converter, having a frame memory and an adder; and a controller for, in reading signal from the same one pixel, effecting control so that there is a difference corresponding to one frame period between timing at which a first signal level is read out after transfer and timing at which a second signal level is read out at the time of resetting the memory means.

23 Claims, 16 Drawing Sheets

SOLID-STATE IMAGING APPARATUS

This application claims benefit of Japanese Patent Application No. 2006-196645 filed in Japan on Jul. 19, 2006, the contents of which are incorporated by this reference.

BACKGROUND OF THE INVENTION

The present invention relates to solid-state imaging apparatus using MOS imaging device in which high image quality is made possible by suppressing fixed pattern noise.

Generally in MOS imaging device, a fixed pattern noise (FPN) occurs due to dark current components of pixel or variance in amplification transistor of pixel. Various methods have been proposed as a method for suppressing the fixed pattern noise. For example, CQ Shuppan-Sha (publisher), Basics and Application of CCD/CMOS Image Sensor (pp. 193 to 194) shows a fixed pattern noise suppressing method as will be described below. In particular, as shown in FIG. 1, signals from CMOS image sensor 101 shielded from light are subjected to A/D conversion at A/D converter 102 and are previously stored as reference signal in a frame buffer 103. At a subtracter 104, then, the reference signal stored at the frame buffer 103 is subtracted from image signal outputted from the CMOS image sensor after exposure/accumulation so as to remove/suppress the fixed pattern noise.

Further, besides normal XY-addressing read method, also known as a read method of MOS imaging device is a concurrent shutter (also referred to as global shutter) type read method where exposure period is uniform for all pixels.

SUMMARY OF THE INVENTION

In a first aspect of the invention, there is provided a solid-state imaging apparatus including: a pixel section having two-dimensionally arrayed pixels each having a photoelectric conversion means, a memory means for storing photoelectric conversion signal of the photoelectric conversion means, a transfer means for transferring the photoelectric conversion signal to the memory means, a reset means for resetting the memory means, a discharging means for emitting photoelectric conversion signal accumulated at the photoelectric conversion means, and a read means for reading photoelectric conversion signal of the memory means; an A/D converter for converting a pixel signal outputted from the pixel section into a digital signal; a noise suppressing means for suppressing noise of signal from said A/D converter, having a frame memory for storing signals from the A/D converter, and an adder for adding an output from the frame memory and signal from the AID converter; and a controller for, in reading signal from the same one pixel of the pixel section, effecting control so that there is a difference corresponding to one frame period between timing at which a first signal level of the pixel after transfer of the photoelectric conversion signal to the memory means by the transfer means is read out and timing at which a second signal level of the pixel at the time of resetting the memory means by the reset means is read out.

In a second aspect of the invention, the controller in the solid-state imaging apparatus according to the first aspect includes: a control where photoelectric conversion signals accumulated at the photoelectric conversion means are emitted concurrently for all pixels and the emitting operation is then stopped to start an exposure time interval; a control where the memory means is sequentially reset one line or a plurality of lines at a time so that reset levels corresponding to one frame are read out and inputted to the noise suppressing means; a control where, after completion of readout of the reset levels, photoelectric conversion signals accumulated at the photoelectric conversion means are transferred concurrently for all pixels to the memory means to end an exposure; and a control where signal levels corresponding to one frame are sequentially read out one line or a plurality of lines at a time from the memory means and are inputted to the noise suppressing means.

In a third aspect of the invention, the controller in the solid-state imaging apparatus according to the second aspect stops the discharging operation of photoelectric conversion signals accumulated at the photoelectric conversion means to start an exposure during readout of reset levels when the exposure period is shorter than a period for reading reset levels corresponding to one frame, and stops the discharging operation of photoelectric conversion signals accumulated at the photoelectric conversion means to start the exposure before readout of reset levels when the exposure period is longer than the period for reading reset levels corresponding to one frame.

In a fourth aspect of the invention, the controller in the solid-state imaging apparatus according to the second or third aspect starts to read the reset levels corresponding to one frame substantially one frame period before a point in time when photoelectric conversion signals accumulated at the photoelectric conversion means are transferred concurrently for all pixels to the memory means.

In a fifth aspect of the invention, the controller in the solid-state imaging apparatus according to any one of the first to fourth aspects is made to be capable of switching between: a first read mode where, after sequentially resetting the memory means one line or a plurality of lines at a time and reading reset levels immediately after reset corresponding to one frame, reset levels after passage of one frame period from the resetting of the memory means one line or a plurality of lines at a time are read out corresponding to one frame; and a second read mode where, after sequentially resetting the memory means one line or a plurality of lines at a time and reading reset levels immediately after reset corresponding to one frame, photoelectric conversion signals accumulated at the photoelectric conversion means are transferred concurrently for all pixels to the memory means, and signal levels corresponding to one frame are sequentially read out therefrom one line or a plurality of lines at a time.

In a sixth aspect of the invention, the controller in the solid-state imaging apparatus according to the fifth aspect effects operation of the second read mode after effecting operation of the first read mode one time or a plurality of times.

In a seventh aspect of the invention, the controller in the solid-state imaging apparatus according to the fifth aspect effects operation of the first read mode one time or a plurality of times after effecting operation of the second read mode.

In an eighth aspect of the invention, the controller in the solid-state imaging apparatus according to the fifth aspect effects operation of the second read mode after effecting the first read mode one time or a plurality of times, and further effects operation of the first read mode one time or a plurality of times.

In a ninth aspect of the invention, the noise suppressing means in the solid-state imaging apparatus according to any one of the sixth to eighth aspects detects a noise signal by subtracting in digital signal condition a reset level immediately after reset from a reset level after passage of one frame period read out by operation of the first read mode, detects an optical signal by subtracting in digital signal condition a reset level immediately after reset from a signal level read out by operation of the second read mode, and after effecting an averaging processing used a plurality of noise signals obtained by operation of the first read mode, subtracts in digital signal condition the noise signal after subjected to the averaging processing from the optical signal obtained by operation of the second read mode.

In a tenth aspect of the invention, operation of the second read mode in the solid-state imaging apparatus according to any one of the sixth to eighth aspects is effected for a plurality of times.

In an eleventh aspect of the invention, the solid-state imaging apparatus according to any one of the fifth to tenth aspects further includes a variable gain means for, provided between the pixel section and the A/D converter, effecting gain processing in analog signal condition to the reset level or signal level read out by operation of the first read mode and operation of the second read mode.

In a twelfth aspect of the invention, the variable gain means in the solid-state imaging apparatus according to the eleventh aspect sets the gain for the reset level read out by operation of the first read mode to be higher than the gain for the reset level and signal level read out by operation of the second read mode.

In a thirteenth aspect of the invention, when the variable gain means in the solid-state imaging apparatus according to the eleventh or twelfth aspect sets the gain for the reset level read out by operation of the first read mode to be different from the gain for the reset level and signal level read out by operation of the second read mode, the noise suppressing means corrects the difference in gains before the subtraction processing in digital signal condition between an optical signal and noise signal.

In a fourteenth aspect of the invention, the solid-state imaging apparatus according to any one of the fifth to thirteenth aspects further includes a two-stage shutter release means, wherein the controller effects one time or a plurality of times operation of the first read mode at the time of the shutter release operation of a first stage of the shutter release means, and, at the time of the shutter release operation of a second stage, stops the discharging operation and effects operation of the second read mode one time or a plurality of times.

In a fifteenth aspect of the invention, the solid-state imaging apparatus according to the seventh or eighth aspect further includes a shutter release means, wherein, when a shutter release operation is effected during operation of the first read mode being effected one time or a plurality of times after effecting operation of the second read mode, the controller once interrupts the operation of the first read mode, stops the discharging operation and effects operation of the second read mode one time or a plurality of times, and effects again operation of the first read mode one time or a plurality of times.

In a sixteenth aspect of the invention, the noise suppressing means in the solid-state imaging apparatus according to any one of the fifth to fifteenth aspects detects a noise signal by subtracting in digital signal condition the reset level immediately after reset from the reset level after passage of one frame period read out by operation of the first read mode and stores the noise signal to a frame memory, giving weights respectively to a subsequently obtained noise signal and the noise signal stored at the frame memory, storing an operation result thereof afresh to the frame memory, and, when an optical signal is detected, subtracting in digital signal condition the signal stored at the frame memory from the optical signal.

In a seventeenth aspect of the invention, the noise suppressing means in the solid-state imaging apparatus according to the sixteenth aspect makes the weights variable according to at least one of temperature and elapsed time.

In an eighteenth aspect of the invention, the controller in the solid-state imaging apparatus according to any one of the fifth to seventeenth aspects makes the number of times of operation of the first read mode variable according to at least one of temperature, successive picture taking mode, image quality mode, and optional setting by user.

DESCRIPTION OF THE PREFERRED EMBODIMENTS

Some embodiments of the solid-state imaging apparatus according to the invention will be described below with reference to the drawings.

Embodiment 1

Figure 1:
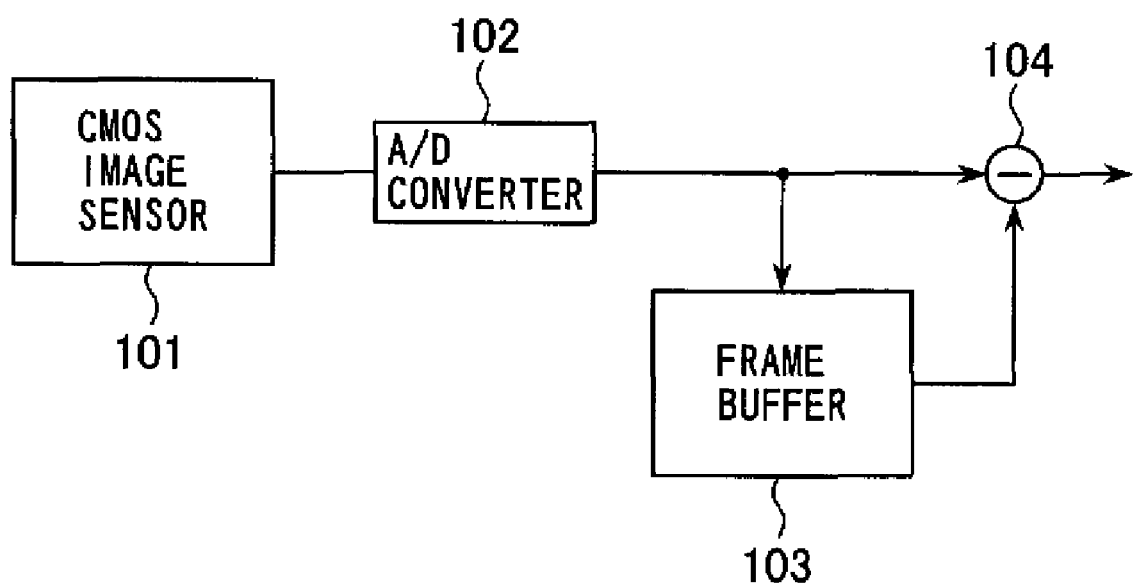
FIG. 1 is a block diagram showing a method for suppressing fixed pattern noise in a prior-art MOS imaging device.
Figure 2:
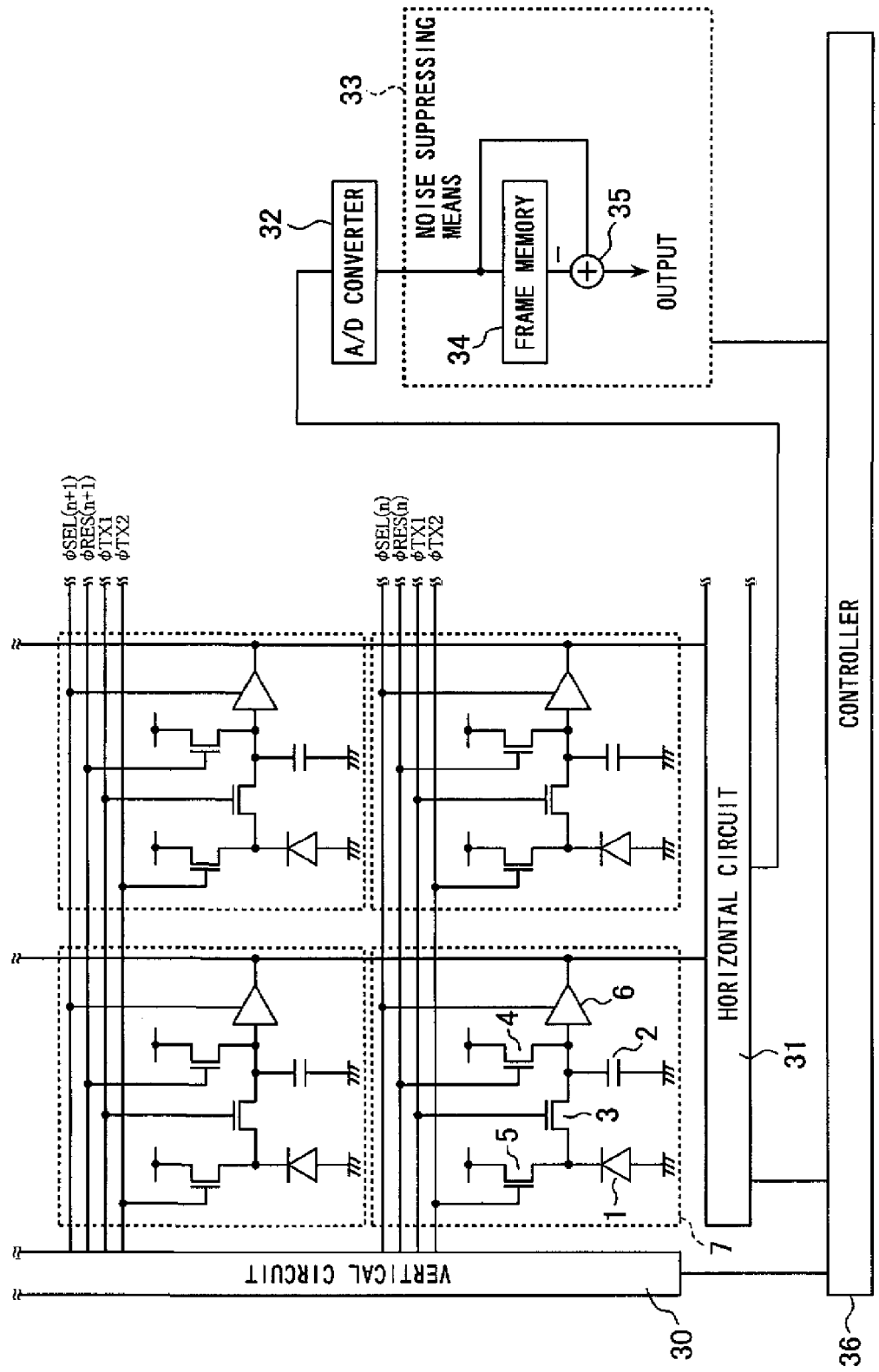
FIG. 2 is a schematic block diagram showing construction of a first embodiment of the solid-state imaging apparatus according to the present invention.

A first embodiment of the solid-state imaging apparatus according to the invention will now be described. FIG. 2 is a schematic block diagram showing construction of the solid-state imaging apparatus according to the first embodiment. Referring to FIG. 2, denoted by 1 is a photoelectric conversion means such as of photodiode, which receives light for a predetermined time to accumulate photoelectric charge and effect photoelectric conversion thereof. The figure also includes: 2, a memory means for retaining photoelectric charge of the photoelectric conversion means 1; 3, a transfer means for transferring photoelectric charge of the photoelectric conversion means 1; 4, a reset means for resetting the memory means 2 to a power supply potential; 5, a discharging means for resetting the photoelectric conversion means 1 to a power supply potential; 6, a read means for reading charge at the memory means 2; and 7, a unit pixel consisting of the means of the above, forming a pixel section when a plurality of units are arrayed in two dimensions. It should be noted that only a portion consisting of 2 by 2 or four pixels is shown in the illustrated example.

Denoted by 30 is a vertical circuit for outputting each of transfer control signal φTX1, reset control signal φRES(n), discharge control signal φTX2, and read control signal φSEL(n), which respectively control ON and OFF of the transfer means 3, reset means 4, discharging means 5, and read means 6 row by row of the pixel section. Note that the suffix "n" in φRES(n) and φSEL(n) represents the location of row.

A horizontal circuit 31 selects a pixel column from which signal is to be read, and outputs signal of the pixels associated with that pixel column. Denoted by 32 is A/D converter for A/D-converting the signals read out from the read means 6 of each pixel through the horizontal circuit 31. Denoted by 33 is a noise suppressing means for suppressing noise of signal of the pixels outputted from the horizontal circuit 31, which is constituted by a frame memory 34 for storing the signals A/D-converted at A/D converter 32 and an adder 35 for effecting subtraction. Denoted by 36 is a controller for applying signals to the vertical circuit 30, horizontal circuit 31, noise suppressing circuit 33, and other circuit to control their operation, which is so constructed as to effect control in accordance with externally set signals applied from an external source.

Figure 3:
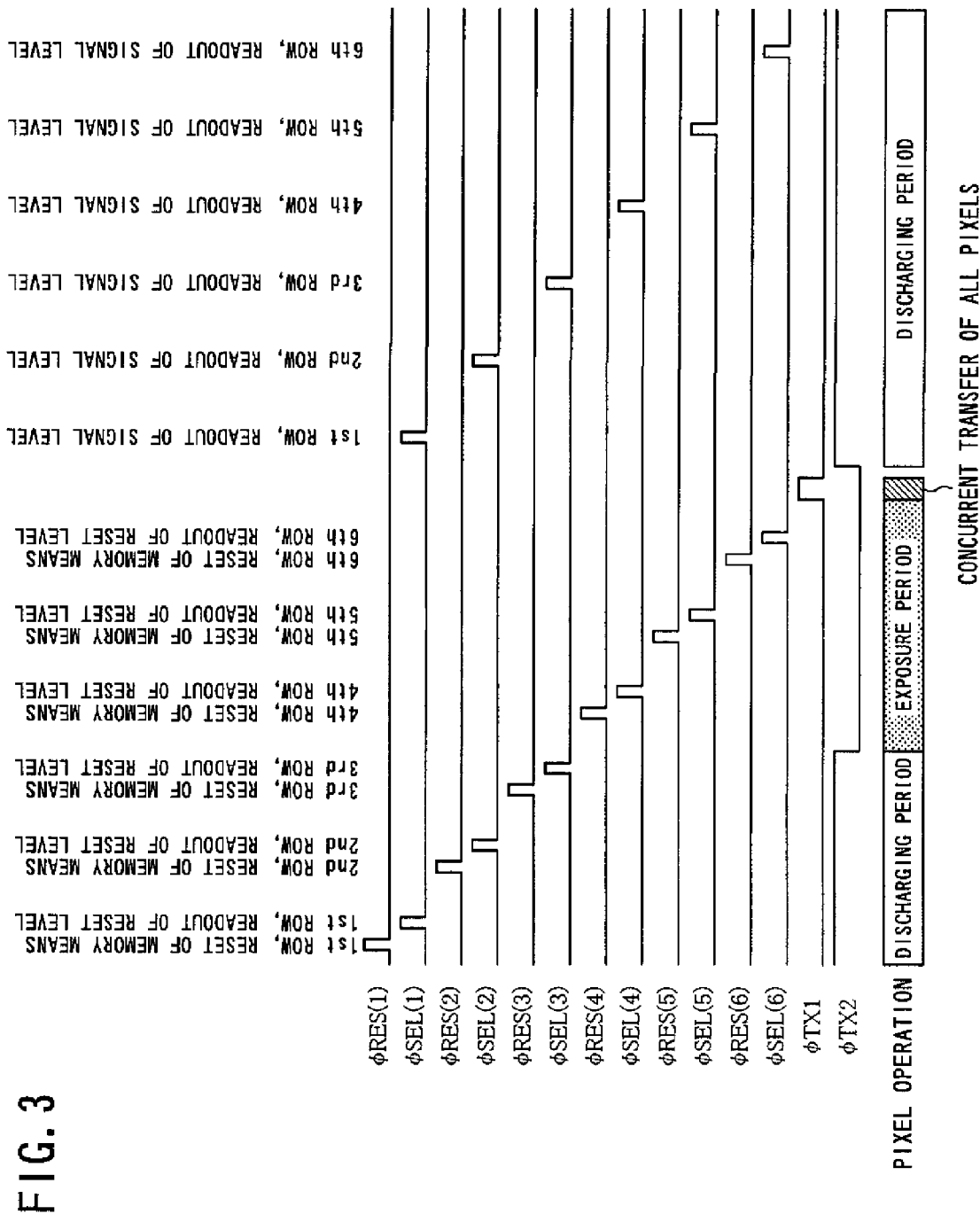
FIG. 3 is a timing chart for explaining operation in the first embodiment shown in FIG. 2.

An operation of the solid-state imaging apparatus according to the first embodiment shown in FIG. 2 will now be described with reference to the timing chart shown in FIG. 3. First as shown in FIG. 3, the memory means 2 of the first row is reset to a power supply potential by turning ON the reset means 4 of the pixels of the first row by reset control signal φRES(1). Next, after turning OFF the reset means 4, the read means 6 is used by read control signal φSEL(1) to read potential immediately after the resetting. The readout reset levels corresponding to one row are A/D-converted by A/D converter 32. The A/D-converted reset levels corresponding to one row are stored to the frame memory 34. This operation is effected sequentially for all rows, and the operation is ended at the point when the reset signals of the last row are stored to the frame memory 34. Here in this example, the sixth row is indicated as the last row.

In the same time duration as this operation, the discharging means 5 of all pixels are concurrently turned OFF by bringing the discharge control signal φTX2 from H level to L level. An exposure of all pixels is thereby started. After achieving a predetermined exposure period, the transfer means 3 of all pixels are simultaneously turned ON by transfer control signal φTX1 at the timing of concurrent transfer of all pixels. The photoelectric charges accumulated at the photoelectric conversion means 1 are thereby concurrently transferred to the memory means 2.

In other words, an exposure is ended. Upon the completion of exposure, signal levels are then read out by using the read means 6 by read control signal φSEL(n) in sequence starting from the first row. The readout signal levels corresponding to one row are A/D-converted by A/D converter 32.

Next, while reading reset levels of the first row from the frame memory 34 to which they are previously stored, reset level of the first row is subtracted from the signal level of the first row at the adder 35. This operation is effected for all pixels in a time series, and it is ended when reset level of the last row is subtracted from the signal level of the last row. By such construction and operation of the first embodiment, all pixels are to simultaneously start an exposure and end the exposure. An occurrence of distorted image is thereby eliminated so that reset (KTC) noise and fixed pattern noise of the pixel section can be removed in digital signal condition. It should be noted that, while such as the reset operation of the memory means and signal read operation from the memory means are effected line by line in the above described operation shown in the timing chart of FIG. 3, operation of a plurality of lines at a time is also possible.

Figure 4:
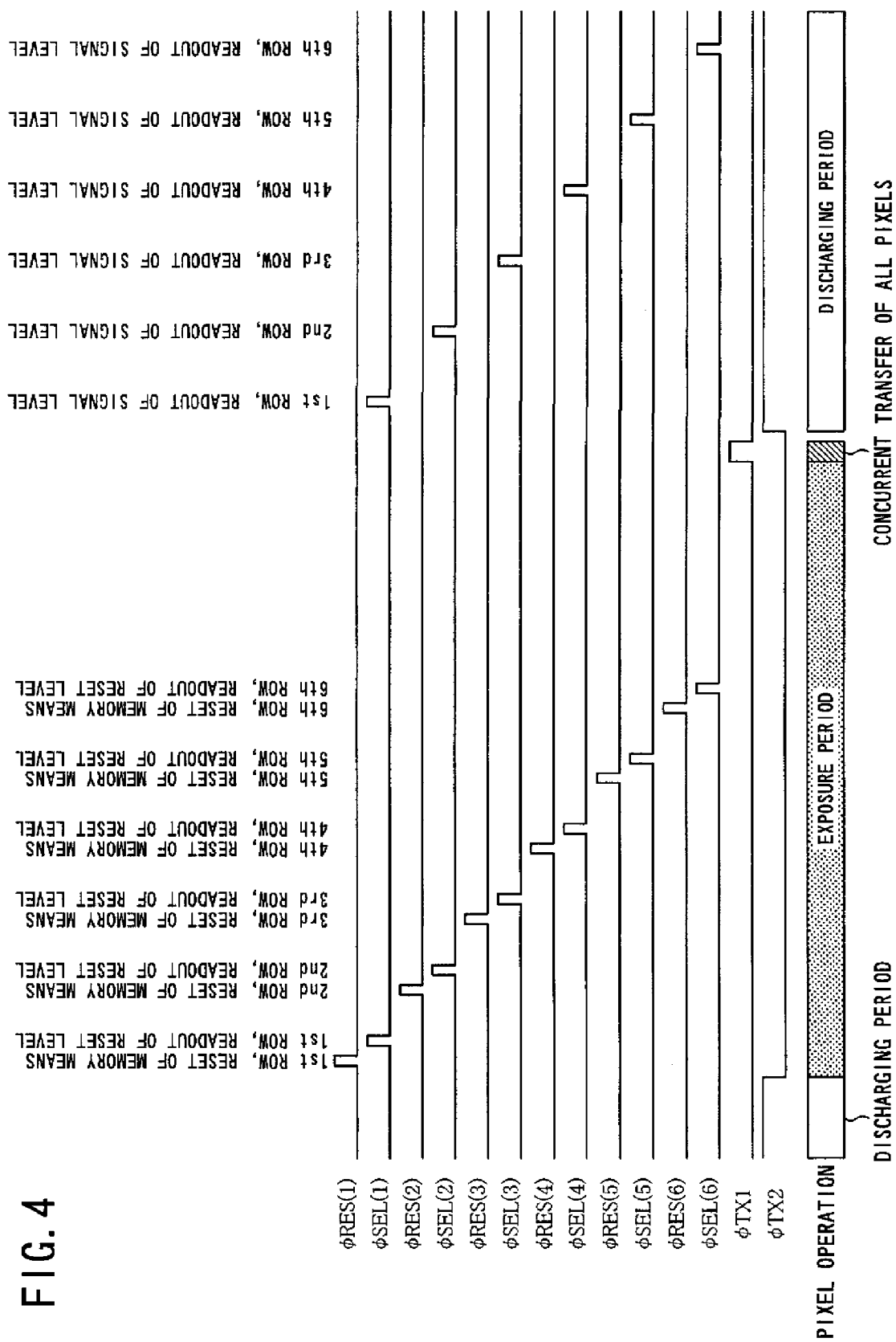
FIG. 4 is a timing chart for explaining operation in the case where the exposure period is longer than one frame period in the first embodiment shown in FIG. 2.

A description will now be given by way of the timing chart of FIG. 4 with respect to operation in the case where the exposure period is longer than one frame period. The description concerning the timing chart shown in FIG. 3 has been about the operation where an exposure of all pixels is started by concurrently turning OFF the discharging means 5 of all pixels in the same time duration in which reset levels from the first row to the last rows are read out. The timing chart shown in FIG. 4 is different from operation shown in the timing chart of FIG. 3 in that, subsequent to the concurrent turning OFF of the discharging means 5 of all pixels, reset levels are at first read out in a time series starting from the first row. The other operations thereof are identical to those shown in the timing chart of FIG. 3.

By such operation, in addition to the effect in the case where operation is effected as shown in the timing chart of FIG. 3, it is also possible to make the exposure period longer than a frame rate period, achieving an advantage that it is especially suitable for a long time exposure.

Figure 5:
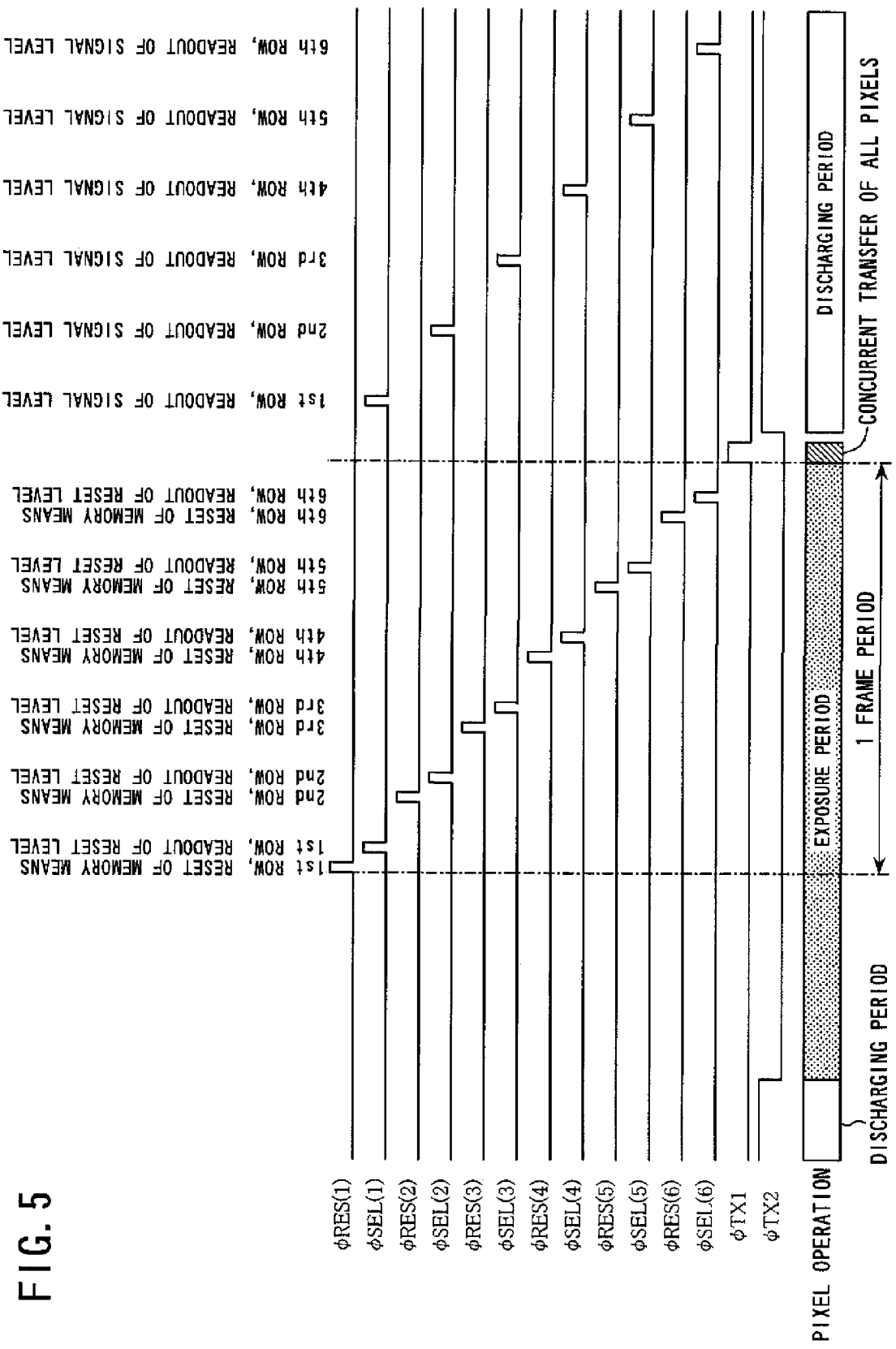
FIG. 5 is a timing chart for explaining starting conditions of readout of reset level in the first embodiment shown in FIG. 2.

The starting conditions of reading reset levels will now be described by way of the timing chart of FIG. 5. In the timing chart shown in FIG. 5, readout of reset levels is started substantially one frame period before the concurrent transfer operation of all pixels. Thereby, in addition to the effect in the case of operation shown in the timing charts of FIGS. 3 and 4, time from reset operation to readout of the memory means 2 can be made shortest so that dark current occurring at that portion and shot noise resulting therefrom may be suppressed to a minimum to achieve an advantage of improved image quality.

Embodiment 2

A second embodiment of the solid-state imaging apparatus according to the invention will now be described.

Figure 6:
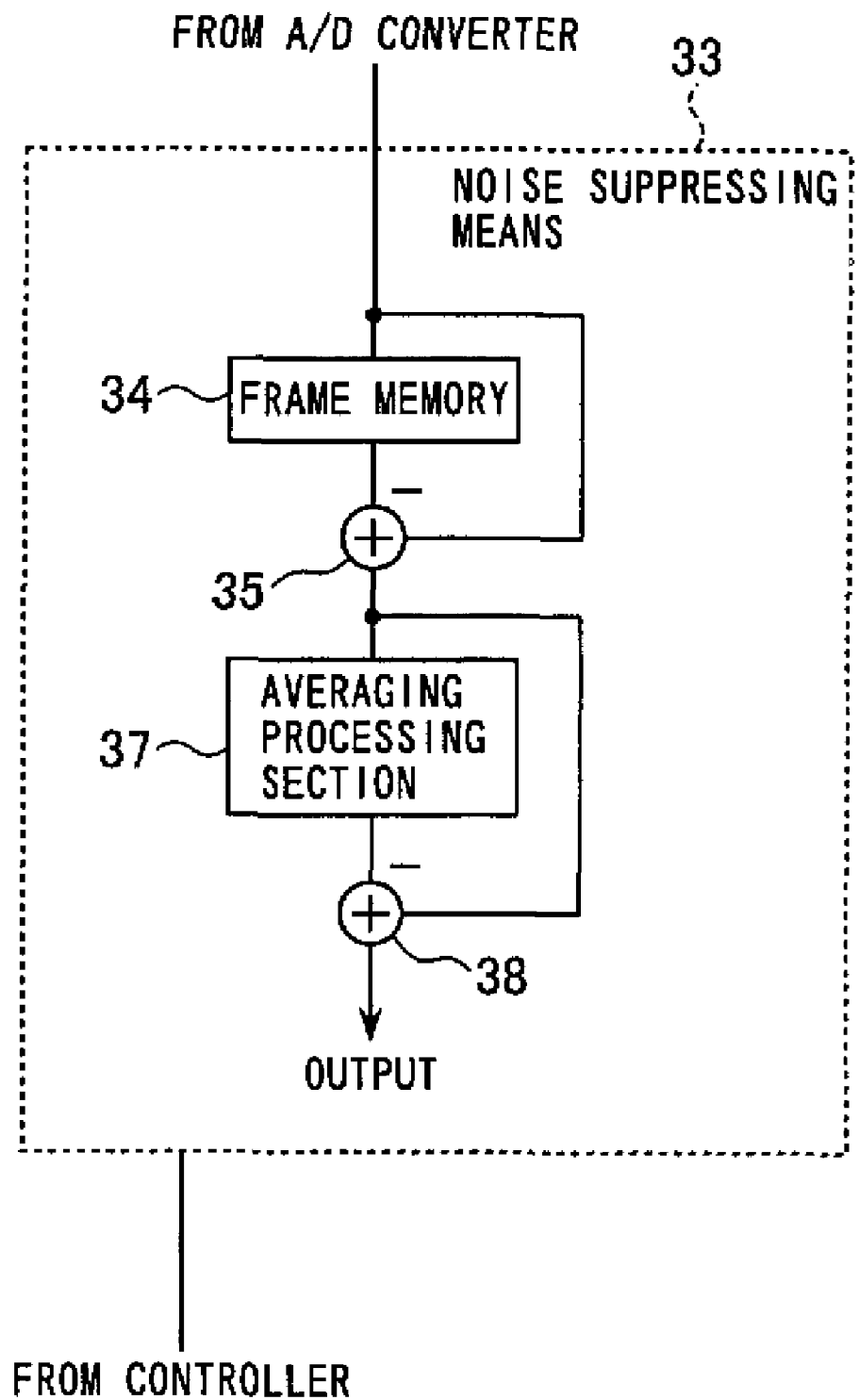
FIG. 6 is a schematic block diagram showing construction of a noise suppressing means in the solid-state imaging apparatus according to the second embodiment.

FIG. 6 is a schematic block diagram showing construction of a noise suppressing means of the solid-state imaging apparatus according to the second embodiment. It is different from the noise suppressing means according to the first embodiment in that an averaging processing section 37 for effecting averaging of acquired image on outputs of the adder 35, and an adder 38 for subtracting an image after the averaging from the signal level are additionally provided. The construction itself except this addition is identical to the first embodiment.

An operation effected in the second embodiment will be described below with reference to the timing chart shown in FIG. 7. The operation of a first read mode in FIG. 7 will now be described. At first in the first read mode, the memory means 2 of the first row are reset to power supply potential by turning ON the reset means 4 of the pixels of the first row. Next, after turning OFF the reset means 4, the read means 6 is used to read potential immediately after the resetting. The readout reset levels corresponding to one row are A/D-converted by A/D converter 32. The A/D-converted reset levels corresponding to one row are stored to the frame memory 34.

This operation is sequentially effected for all rows, and the operation is ended at the point when the reset signals of the last row are stored to the frame memory 34.

Subsequently, reset levels after passage of one frame period from the above reset operation are read out sequentially starting from the first row with using the read means 6. The readout reset levels corresponding to one row after passage of one frame period from the reset operation are AD-converted by AID converter 32.

Next, while reading reset levels immediately after the resetting of the first row from the frame memory 34 to which they are previously stored, the reset level immediately after the above resetting of the first row is subtracted at the adder 35 from the reset level after passage of one frame period of the first row. This operation is effected for all pixels in a time series. The operation is ended at the point when the reset level immediately after the resetting of the last row is subtracted from the reset level after passage of one frame period of the last row whereby read operation by the first read mode is ended.

The operation of a second read mode in FIG. 7 will now be described. At first in the second read mode, the memory means 2 of the first row are reset to power supply potential by turning ON the reset means 4 of the pixels of the first row. Next, after turning OFF the reset means 4, the read means 6 is used to read potential immediately after the resetting. The readout reset levels corresponding to one row are A/D-converted by A/D converter 32. The A/D-converted reset levels corresponding to one row are stored to the frame memory 34. This operation is sequentially effected for all rows, and the operation is ended at the point when the reset signal of the last row is stored to the frame memory.

Next, at the timing of a concurrent transfer of all pixels after passage of a predetermined exposure period, the transfer means 3 of all pixels are simultaneously turned ON. The photoelectric charges accumulated at the photoelectric conversion means 1 are thereby concurrently transferred to the memory means 2. In other words, the exposure period is ended. When the exposure period is complete, the read means 6 is then used to sequentially read signal levels starting from the first row. The readout signal levels corresponding to one row are A/D-converted by A/D converter 32.

Next, while reading reset levels immediately after the resetting of the first row from the frame memory 34 to which they are previously stored, the reset level immediately after the above resetting of the first row is subtracted at the adder 35 from the signal level of the first row. This operation is effected for all pixels in a time series, and is ended at the point when the reset level immediately after the resetting of the last row is subtracted from the signal level of the last row whereby operation of the second read mode is complete.

Figure 7:
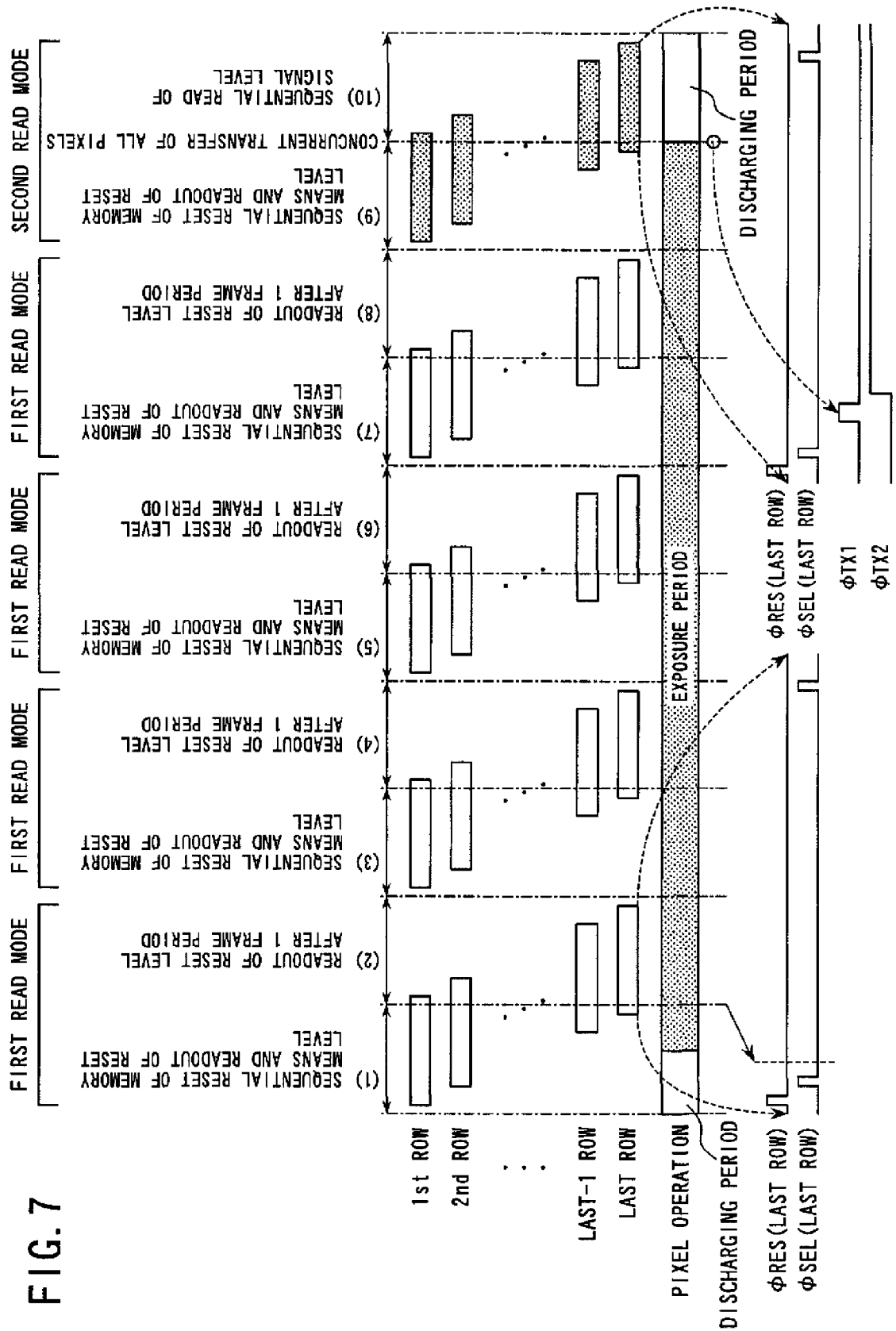
FIG. 7 is a timing chart for explaining an example of operation in the second embodiment shown in FIG. 6.

The timing chart in FIG. 7 shows the manner where operation of the first read mode is performed four times and the second read mode one time. In operation of the first-time first read mode:

The reset (KTC) noise and fixed pattern noise of the pixel section are contained in the image obtained by the processing indicated by (1) of FIG. 7 (sequential reset of the memory means and readout of the reset level).

In addition to the reset (KTC) noise and fixed pattern noise of the pixel section, the dark current component occurring at the memory means 2 and shot noise component resulting therefrom are contained in the image obtained by the processing indicated by (2) (readout of reset level after passage of one frame period).

The reset (KTC) noises and fixed pattern noises of the pixel section by the processing of (1) and (2) are correlated.

By the subtraction processing of [(2)–(1)], the reset (KTC) noise and fixed pattern noise of the pixel section are removed in digital signal condition so that it is possible to obtain a noise signal with the remaining shot noises due to the dark current component of the memory means 2 which is a fixed pattern noise component, and the dark current which is a random noise component.

Similar drive is effected also for the second-time to fourth-time first read mode:

By the subtraction processing of [(4)–(3), (6)–(5), (8)–(7)], the reset (KTC) noise and fixed pattern noise of the pixel section are similarly removed in digital signal condition, and it is possible to obtain shot noises due to the dark current component of the memory section which is a fixed pattern noise component, and the dark current which is a random noise component.

Next in operation of the second read mode:

The reset (KTC) noise and fixed pattern noise of the pixel section are contained in the image obtained by the processing indicated by (9) of FIG. 7 (sequential reset of the memory means and readout of the reset level).

In addition to the reset (KTC) noise and fixed pattern noise of the pixel section, the dark current component occurring at the memory means 2 and shot noise component resulting therefrom as well as an optical signal by a predetermined exposure period are contained in the image obtained by the processing indicated by (10) (sequential read of signal level).

Here the reset (KTC) noises and fixed pattern noises of the pixel section by the processing of (9) and (10) are correlated.

By the subtraction processing of [(10)–(9)], the res et (KTC) noise and fixed pattern noise of the pixel section are removed in digital signal condition so that it is possible to obtain an optical signal with the remaining shot noise due to dark current component of the memory section which is a fixed pattern noise component, and dark current which is a random noise component.

Next at the averaging processing section 37:

The processing such as added averaging is effected for the four noise signals by the respective subtraction processing of [(2)–(1), (4)–(3), (6)–(5), (8)–(7)]. It is thereby possible to obtain an averaged noise signal with suppressing shot noise due to dark current of the memory means 2 which is a random noise component of the noise signal.

Next, the above averaged noise signal is subtracted from the optical signal obtained by the subtraction processing of [(10)–(9)]. Since the fixed pattern noise due to the dark current component of the memory means 2 remaining in the optical signal is thereby removed, and since the effect of the random noise component of the noise signal due to subtraction can be made smaller, a high quality image can be obtained. Further, the operation example shown in FIG. 7 in the second embodiment is exceptionally effective when the exposure period is relatively long, and the dark current component of the memory means 2 can be efficiently obtained while the pixel operation is in the exposure period. Accordingly, the solid-state imaging apparatus according to the second embodiment used as a camera makes it possible to exceptionally shorten a total photographing interval and thus is suitable. While four times of the first read mode have been performed in the above operation example shown in FIG. 7, it is naturally possible to use any number as the number of times of execution of the first read mode. The number of times of execution of the first read mode is preferably changeable according to temperature, successive taking mode, image quality mode, and also to an optional setting by user.

Another operation example (drive example) in the second embodiment will now be described by way of the timing chart shown in FIG. 8. It is different from the operation example shown in FIG. 7 as follows. In particular, the operation example shown in FIG. 7 has been shown as one where operation by the first read mode is previously performed for a plurality of times and then operation by the second read mode is performed one time. By contrast, in the operation example shown in FIG. 8: operation by the first read mode is effected for a plurality of times; operation by the second read mode is then effected one time; and operation by the first read mode is effected again. Specifically, the noise signal by the first read mode operation is stored for example to a memory by a number of times that can be obtained within an exposure period, if the exposure period is shorter than that of the operation example shown in FIG. 7 (corresponding to several frames). Then after performing operation by the second read mode one time, additional operation by the first read mode is effected for a number of times falling short of a predetermined number.

It is thereby possible, with maintaining high image quality, to effect drive so as to make shutter release lag to a minimum and at the same time to achieve a shortest total photographing interval. In the case of the operation example shown in FIG. 8, a frame memory for example becomes necessary to temporarily store an optical signal obtained by operation of the second read mode effected in the middle. This point, however, is not essential to the present invention and will not be described.

Figure 9:
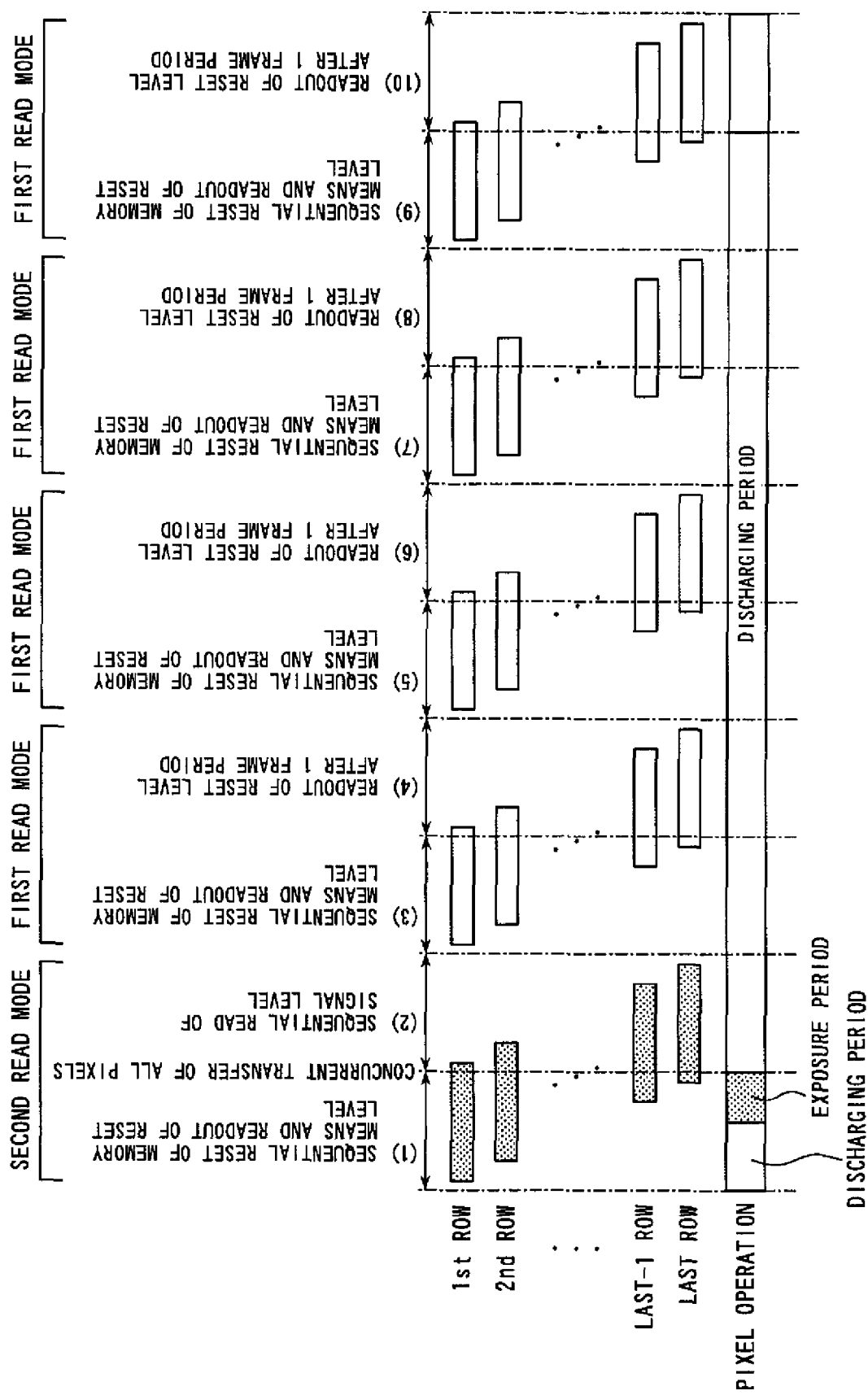
FIG. 9 is a timing chart for explaining a further example of operation in the second embodiment shown in FIG. 6.

A further operation example of the second embodiment will now be described by way of the timing chart shown in FIG. 9. It is different from the operation example shown in FIG. 7 as follows. In particular, the operation example shown in FIG. 7 has been shown as one where operation by the first read mode is previously performed for a plurality of times and then operation by the second read mode is performed one time. By contrast, in the operation example shown in FIG. 9, operation by the second read mode is previously effected one time, and then operation by the first read mode is effected for a plurality of times. Specifically, when the exposure period is much shorter than that of the operation example shown in FIG. 7, the shutter release lag becomes longer if operation by the first read mode is effected first. To avoid this, in this operation example, the second read mode operation is effected first, and then the first read mode operation is effected for a necessary number of times.

Figure 8:
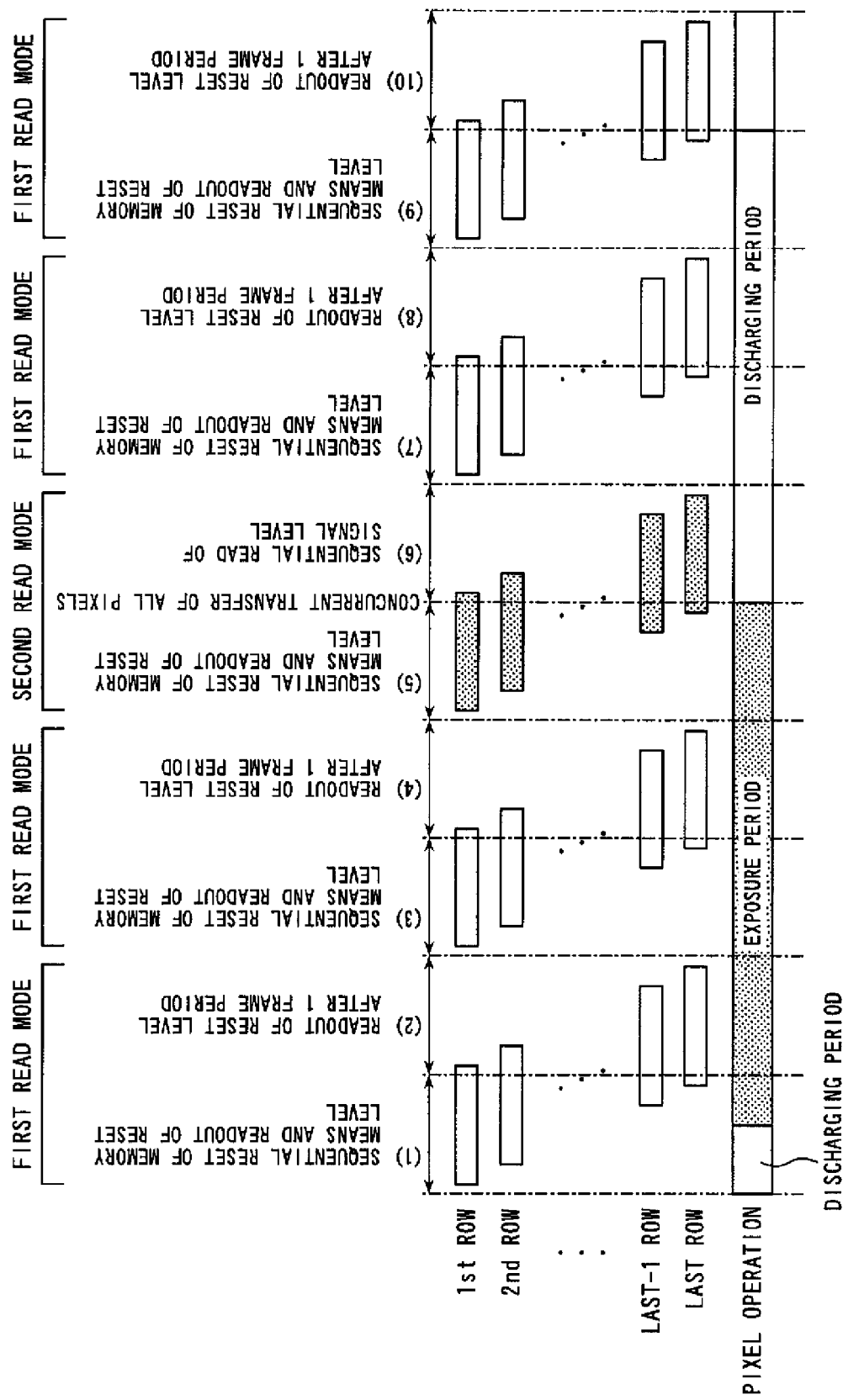
FIG. 8 is a timing chart for explaining another example of operation in the second embodiment shown in FIG. 6.

Also in this operation example (drive mode) similarly to the operation example shown in FIG. 8, it is possible with maintaining high image quality to make shutter release lag to a minimum and to thereby achieve a shortest total photographing interval, and in addition to correspond to high-speed shutter. Further, also in the case of this operation example, a frame memory for example similarly becomes necessary to temporarily store an optical signal obtained by operation of the second read mode. This point, however, is not essential to the present invention and will not be described.

Figure 10:
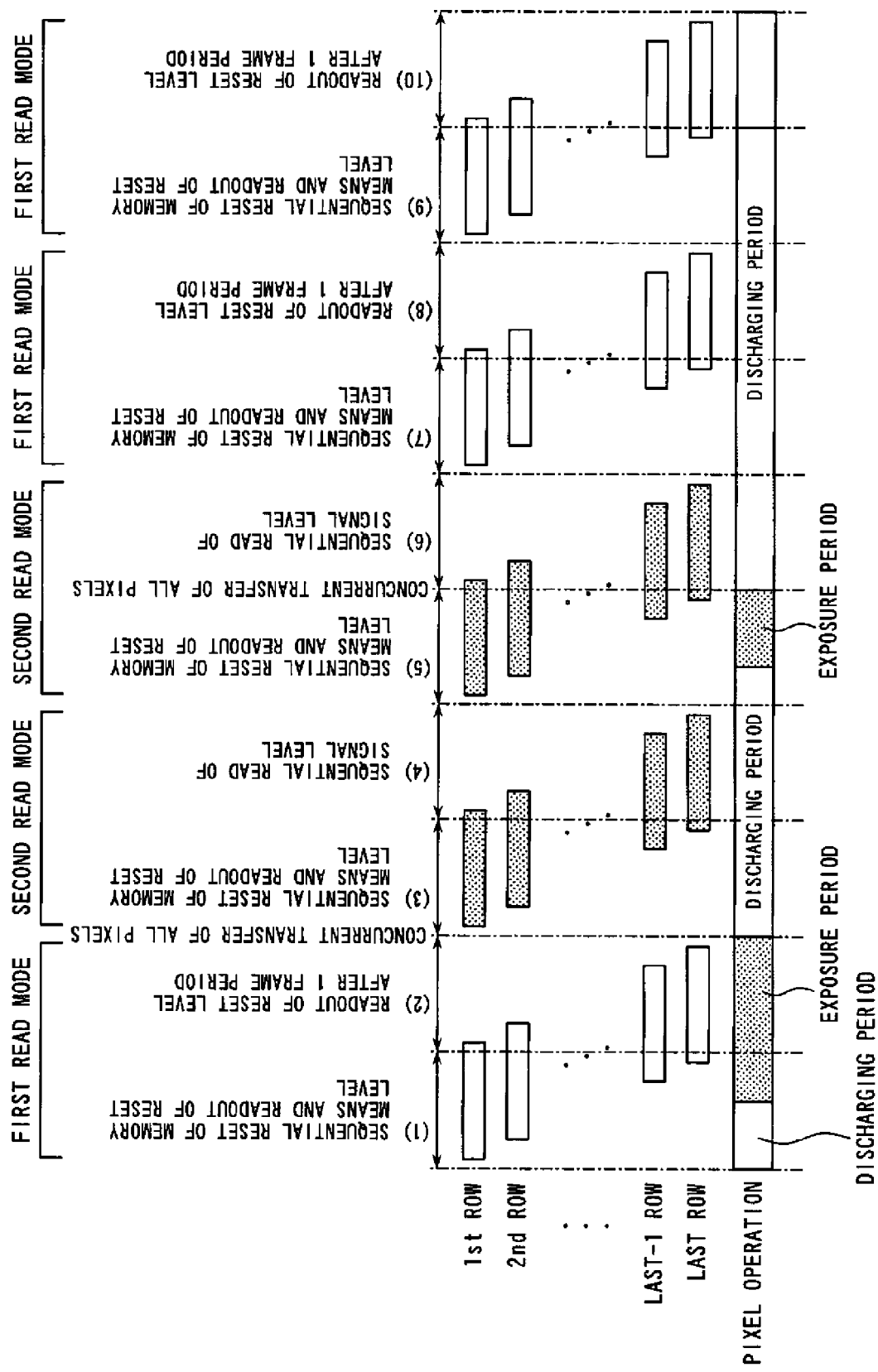
FIG. 10 is a timing chart for explaining a further example of operation in the second embodiment shown in FIG. 6.

A further operation example of the second embodiment will now be described by way of the timing chart shown in FIG. 10. It is different from the operation examples shown in FIGS. 7 to 9 in that the second read mode operation is effected for a plurality of times. The case of this operation example is especially effective in a high-speed successive taking mode, and time from a first-time second read mode operation to the next second read mode operation can be made shorter. It is thereby possible to correspond to a high-speed successive image taking with maintaining high image quality. Here, the number of times of execution of the second read mode operation is not limited to two times, and any number is naturally possible. Further, the first read mode operation may be effected at any point before, before and after, or after the second read mode operation.

Figure 11:
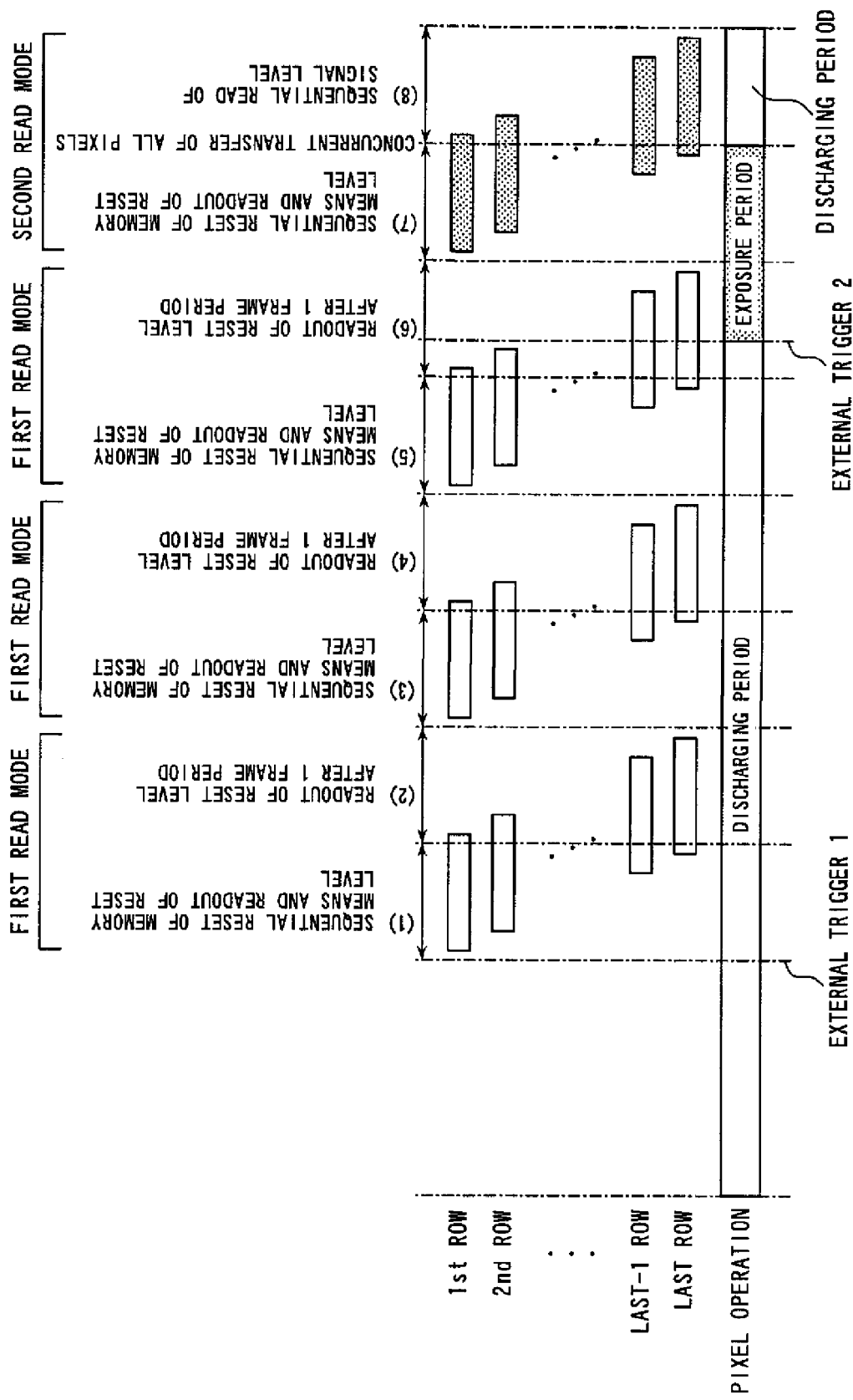
FIG. 11 is a timing chart for explaining a further example of operation in the second embodiment shown in FIG. 6.

A further operation example of the second embodiment will now be described by way of the timing chart shown in FIG. 11. Many of the still picture cameras have a 2-stage shutter release mechanism. Generally in such case, the processing such as AF is effected in a half-pressed condition of the shutter (release of the first stage), and the system enters a main photographing by a fully pressed condition of the shutter (release of the second stage). In the timing chart shown in FIG. 11, an external trigger 1 corresponds to the first-stage release and an external trigger 2 to the second-stage release. With the timing of the operation example indicated here, the system enters the first read mode operation when the external trigger 1 is received, and enters the second read mode operation when the external trigger 2 is received.

It is thereby possible to previously obtain a noise signal even in the case where the exposure period is short (high-speed shutter). Accordingly, it can correspond to high-speed shutter with maintaining high image quality even when a high-speed shutter is used. Further, since it is also possible to promptly enter the next photographing operation, a shortest photographing interval can be achieved. Here, while the first read mode operation is effected before the second read mode operation in the manner shown in the timing chart of FIG. 11, it is naturally also possible that the first read mode operation corresponding to insufficiency be effected after the second read mode operation.

Figure 12:
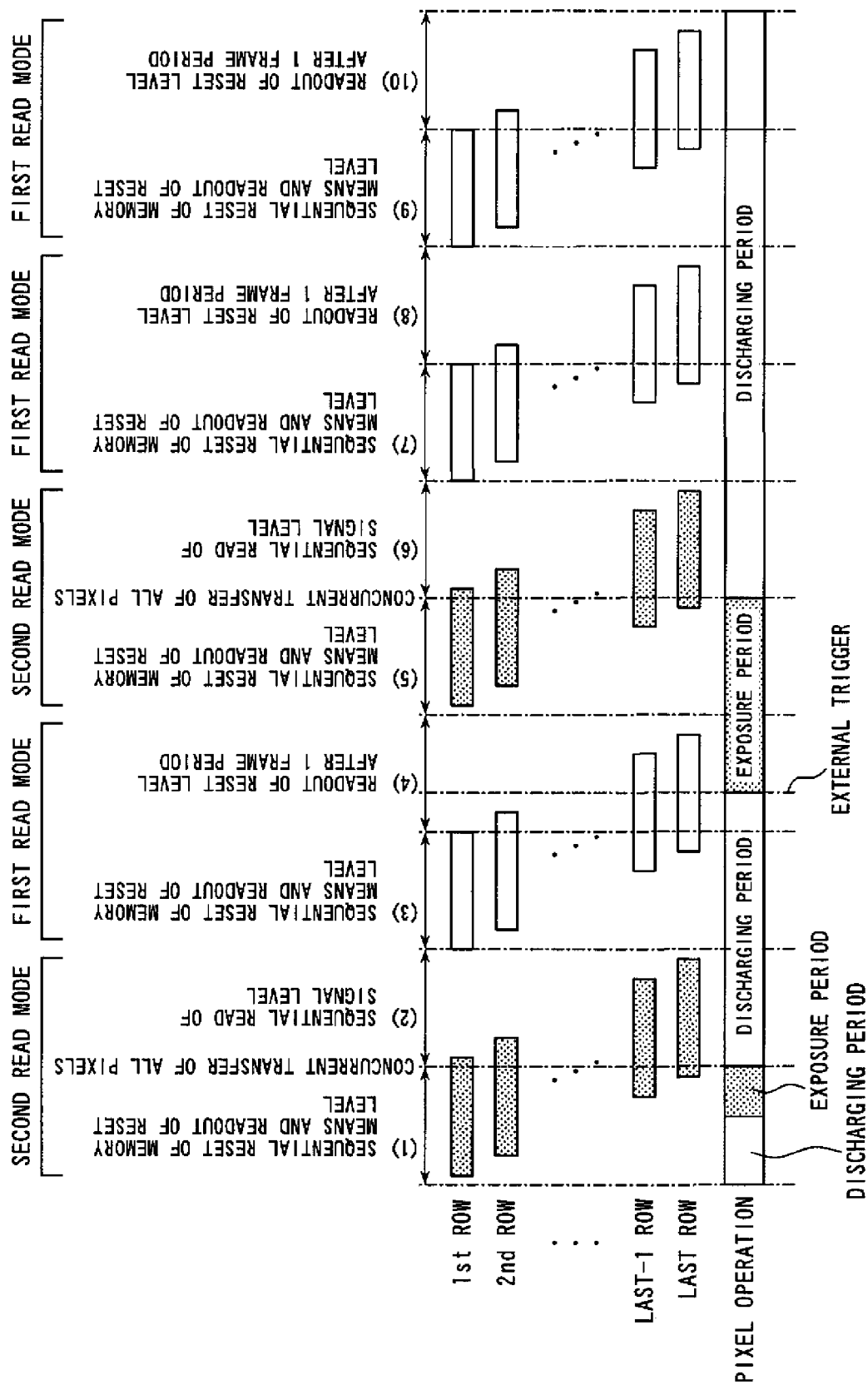
FIG. 12 is a timing chart for explaining a further example of operation in the second embodiment shown in FIG. 6.

A further operation example of the second embodiment will now be described by way of the timing chart shown in FIG. 12. This operation example is different from the operation examples shown in the other timing charts as follows. In particular, the operation is different in the case where an external trigger of main photographing comes from an external source during when a plurality of times the first read mode operation is being effected after the second read mode operation. A case of missing the next photographing opportunity occurs if a necessary number of times of the first read mode operation are effected. With the timing of this operation example shown in FIG. 12, operation of the first read mode is immediately interrupted when an external trigger of main photographing is detected. After effecting the second read mode operation, then, the first read mode operation corresponding to insufficiency is effected again.

It is thereby possible to manipulate the shutter at an optional timing so that an advantage of not missing a photographing opportunity is obtained with maintaining high image quality.

Embodiment 3

Figure 13:
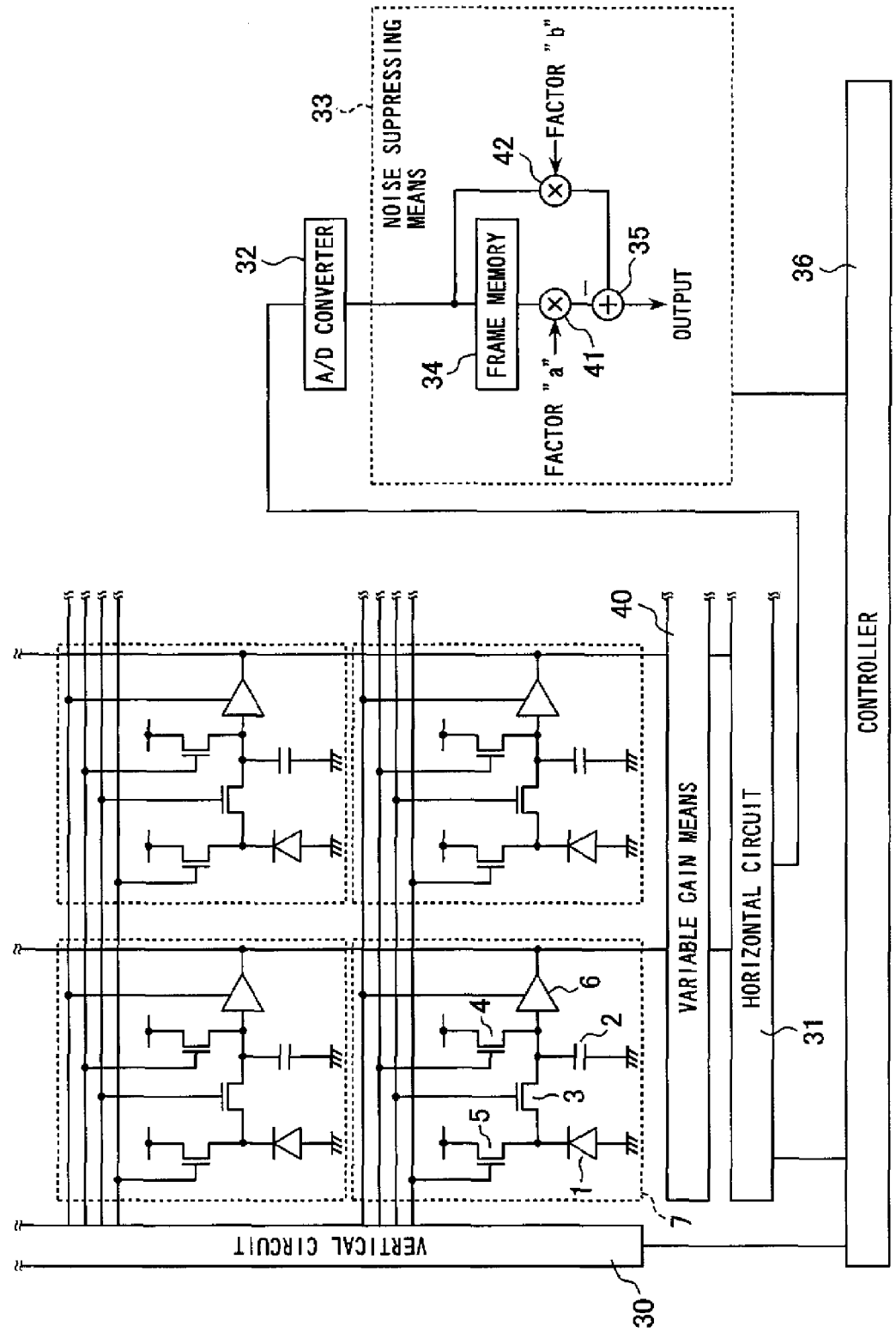
FIG. 13 is a schematic block diagram showing construction of the solid-state imaging apparatus according to a third embodiment.

A third embodiment of the solid-state imaging apparatus according to the invention will now be described. FIG. 13 is a schematic block diagram showing construction of the solid-state imaging apparatus according to the third embodiment. It is different from the first embodiment shown in FIG. 2 in that a variable gain means 40 in analog signal condition is provided between the read means 6 of the unit pixel 7 and A/D converter 32, and a multiplier 41 and multiplier 42 are added to the noise suppressing means 33. Those which may be employed as the variable gain means 40 in analog signal condition include but not limited to a column amplifier.

In the present embodiment, signals to be outputted from the read means 6 of the unit pixel 7 and inputted to the variable gain means 40 are the signals of the following types:

Reset level immediately after reset in the first read mode operation . . . (11)

Reset level after passage of one frame period from the resetting in the first read mode operation . . . (12)

Reset level immediately after reset in the second read mode operation . . . (11)

Signal level in the second read mode operation . . . (13)

The reset (KTC) noise and fixed pattern noise of the pixel section are contained in image by (11).

In addition to the reset (KTC) noise and fixed pattern noise of the pixel section, the dark current component occurring at the memory means 2 and shot noise resulting therefrom are contained in image by (12).

In addition to the reset (KTC) noise and fixed pattern noise of the pixel section, the dark current component occurring at the memory means 2 and shot noise component resulting therefrom as well as an optical signal by a predetermined exposure period are contained in image by (13). When the amplitudes of these signals are compared, the result is (11)<(12)<(13).

In general, when each circuit of an apparatus is designed by a power supply voltage of the order of 3V, the signal amplitude that can be treated at each circuit becomes of the order of 1V. Since the reset levels associated with (11) and (12) are very small in amplitude, the output of amplifier is not saturated even when a high gain is applied.

When the gain is increased for example by a column amplifier, SNR can be improved, since the amplifier noise in subsequent process and quantization noise of A/D converter appear to be relatively small.

Here, since an offset voltage is superimposed on the signals read out from the read means 6 of the unit pixel 7, a high gain without change cannot be applied in some cases.

Although there are also methods for obtaining a difference for example with a reference voltage, these are unlike the substance of the present invention and will not be described. In the above third embodiment, it is supposed that reset level immediately after reset for example in the first read mode operation is amplified by a factor a at the variable gain means 40 and stored to the frame memory 34, and that reset level after passage of one frame period from the resetting is amplified by a factors at the variable gain means 40.

Since a subtraction is impossible with the condition as it is, SNR of noise signal can be improved by putting a factor "a" of the multiplier 41 and factor "b" of the multiplier 42 as a:b=$\beta$:$\alpha$. Further it is supposed in the second read mode operation that reset level immediately after reset is amplified by a factor $\gamma$ at the variable gain means 40 and stored to the frame memory 34, and that signal level is amplified by a factor $\delta$ at the variable gain means 40. Since a subtraction is impossible with the condition as it is, SNR of optical signal can be improved by putting a factor "a" of the multiplier 41 and factor "b" of the multiplier 42 as a:b=$\delta$:$\gamma$. Here a maximum advantage is obtained by applying high gain on those with smaller signal amplitude.

Embodiment 4

Figure 14:
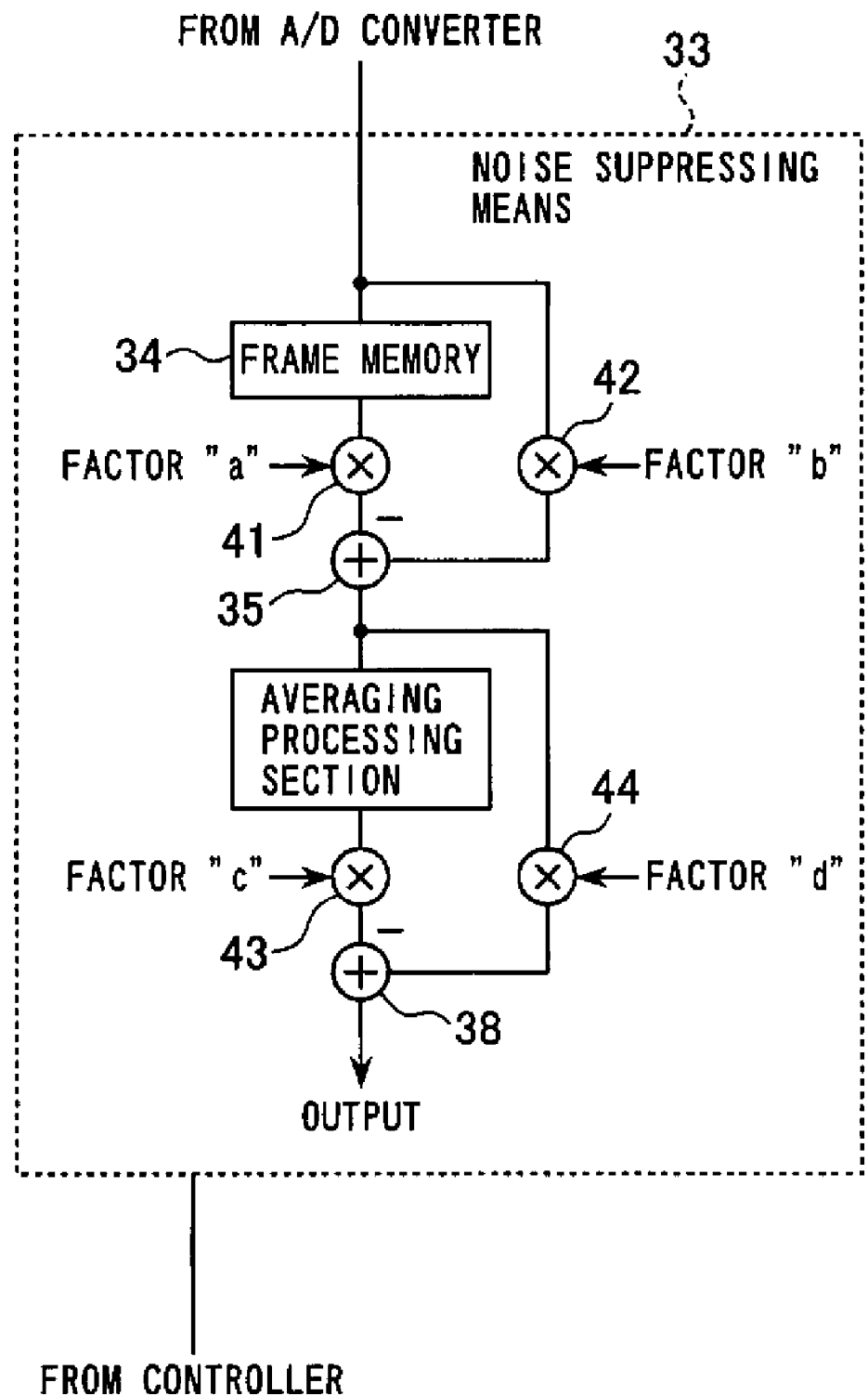
FIG. 14 is a schematic block diagram showing construction of the noise suppressing means in the solid-state imaging apparatus according to a fourth embodiment.

A fourth embodiment of the invention will now be described. FIG. 14 is a schematic block diagram showing construction of the noise suppressing means of the solid-state imaging apparatus according to the fourth embodiment. It is different from the noise suppressing means of the third embodiment shown in FIG. 13 as follows. In particular, a multiplier 43, multiplier 44, an averaging processing section 37 for effecting an averaging of obtained images to the output of the adder 35, and an adder 38 for subtracting image after the averaging from the signal level are added. The construction of the other portion is identical to that of the third embodiment.

In operation of the first read mode as has been described in the third embodiment shown in FIG. 13, the reset level immediately after reset is amplified by a factor $\alpha$ at the variable gain means 40 and is stored to the frame memory 34. Further, the reset level after passage of one frame period from the resetting is amplified by a factor $\beta$ at the variable gain means 40, and a noise signal is detected with putting a factor "a" of the multiplier 41 and factor "b" of the multiplier 42 as a:b=$\beta$:$\alpha$. In operation of the second read mode, the reset level immediately after reset is amplified by a factor $\gamma$ at the variable gain means 40 and is stored to the frame memory 34, the signal level being amplified by a factor $\delta$ at the variable gain means 40, and then an optical signal is detected with putting the factor "a" of the multiplier 41 and factor "b" of the multiplier 42 as a:b=$\delta$:$\gamma$.

At this time, the noise signal is represented as:

$$(12) \times \beta \times \alpha - (11) \times \alpha \times \beta.$$

Further, the optical signal is represented as:

$$(13) \times \delta \times \gamma - (11) \times \gamma \times \delta.$$

Subsequently, random noise component of the noise signal is suppressed at the averaging processing section 37.

It is then possible to limit the subsequent amplifier noise and quantization noise of A/D converter to a minimum by putting a factor "c" of the multiplier 43 and factor "d" of the multiplier 44 as c:d=$\gamma \times \delta$:$\alpha \times \beta$ so as to achieve a further improvement in image quality.

Embodiment 5

Figure 15:
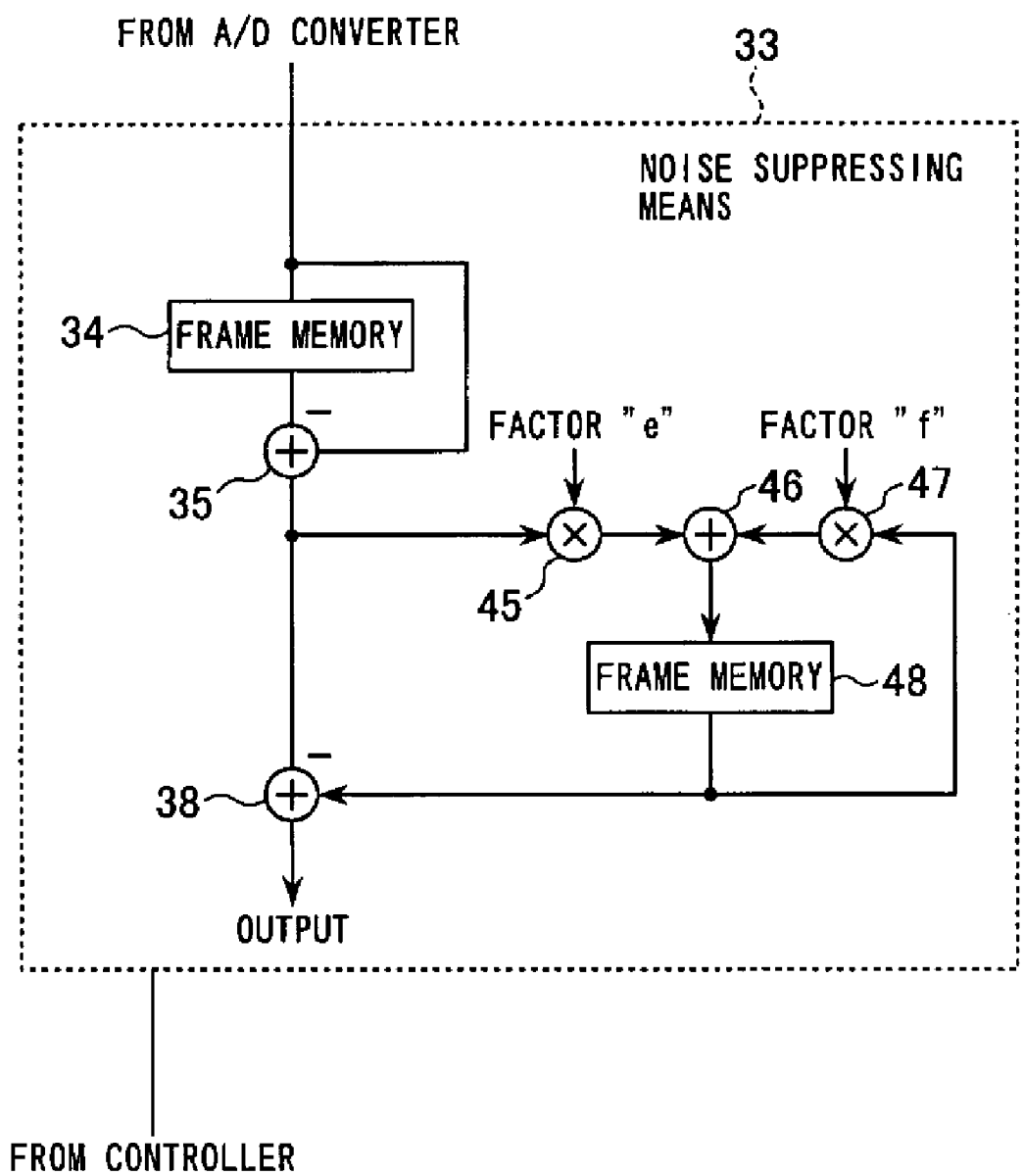
FIG. 15 is a schematic block diagram showing construction of the noise suppressing means in the solid-state imaging apparatus according to the fifth embodiment.

A fifth embodiment of the invention will now be described. FIG. 15 is a schematic block diagram showing construction of the noise suppressing means of the solid-state imaging apparatus according to the fifth embodiment. It is different from the noise suppressing means of the second embodiment shown in FIG. 6 in that a multiplier 45, adder 46, multiplier 47, and frame memory 48 are added instead of the averaging processing section 37. The construction of the other portion is similar to the second embodiment or the third embodiment. Here, the multiplier 45, adder 46, multiplier 47, and frame memory 48 are the means for detecting fixed pattern noise occurring at the memory means 2 of pixel while suppressing random noise component of the noise signal at the same time. A noise signal for suppressing fixed pattern noise due to dark current component of the memory means 2 remaining in the optical signal is stored to the frame memory 48.

An operation of the noise suppressing means 33 having such construction will now be described. The multiplier 45 is a multiplier for giving weight to the newest noise component obtained at a certain point in time. Such weighting factor "e" is given by 1/$\epsilon$. The greater the factor $\epsilon$ at the variable gain means 40, the smaller the weight thereof so that it is less likely to be affected by the newest noise component. In conformity with this, a factor "f" of the multiplier 47 is determined as "factor f=($\epsilon$−1)/$\epsilon$". Here, factor "e", "f" are set so that (e+f) is always 1. Further it is constructed so that the weighting factors may be variable by temperature and time elapse. For example, if $\epsilon$=1 is put when the newest noise signal at the time of power ON is to be read, "e=1, f=0" is obtained so that the newest noise signal is stored to the frame memory 48 as it is without change.

A description will now be given of the case where the weighting factor "e" is varied. Supposing ∈=8, "e=⅛, f=⅞" is obtained. The newest noise signal is multiplied by the factor "e", and the noise signal read out in the same time duration from the frame memory 48 is multiplied by factor "f". An addition is effected at the adder 46 so that e+f=1. With effecting operation as the above, the random noise component of the noise signal can be reduced without unnecessarily acquiring noise signals so that a fixed pattern noise component contained in the noise signal can be read out at any time when it is necessary. Accordingly, with a minimum acquisition of noise signal, it is possible to read a noise signal with less random noise component at all times with always following the dark current component of the memory means 2 of pixel that occurs for example due to temperature change.

A shortest photographing interval is thereby achieved to improve speed of successive photographing, and an equivalent advantage is obtained also for the previously described processing of image quality improvement. Here, while such as the bit accuracy of the noise suppressing means 33 constituted by digital circuits is not essential to the present invention and will not be described, various circuits are added thereto so as to secure accuracy in actual circuit construction.

Embodiment 6

Figure 16:
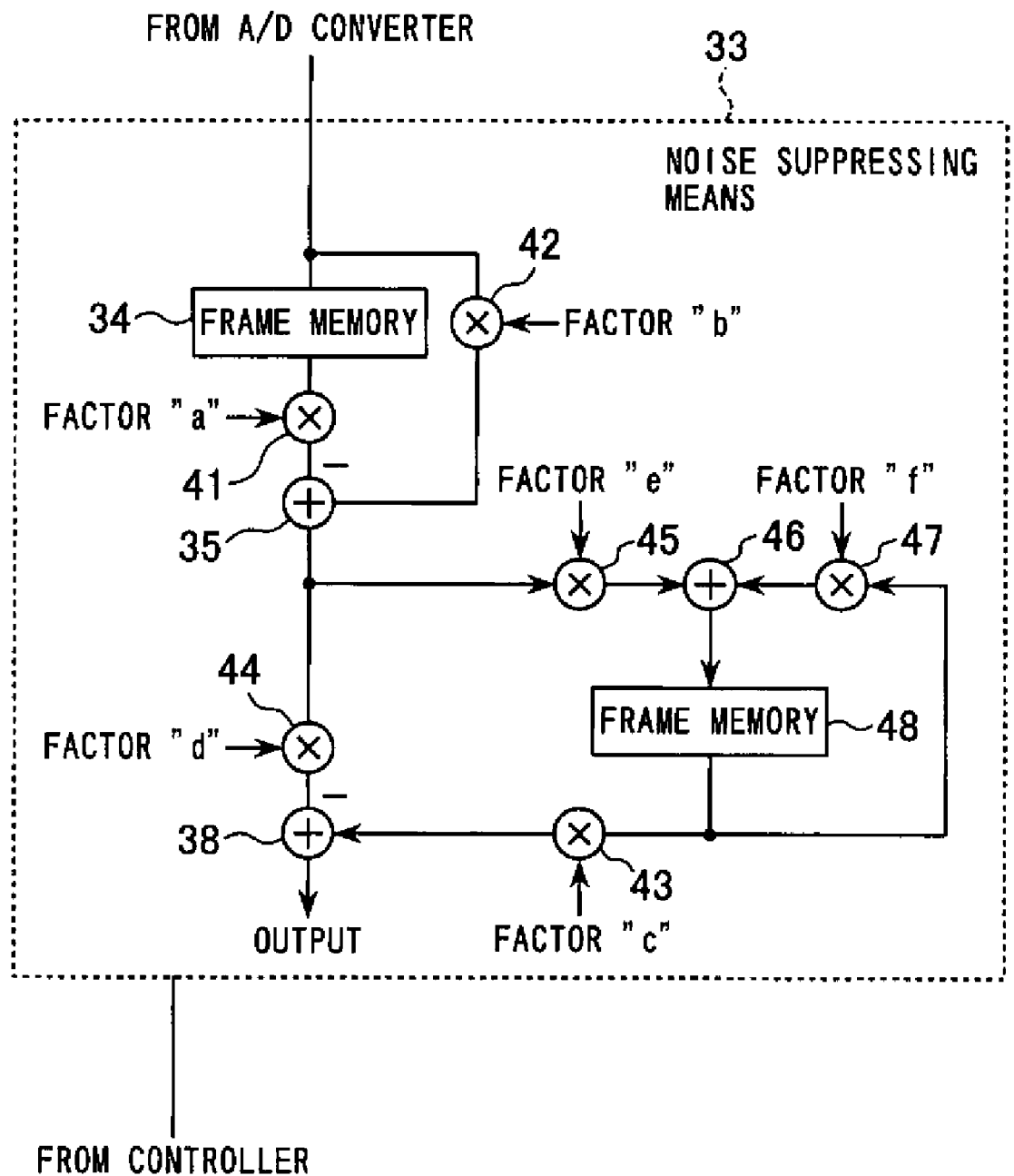
FIG. 16 is a schematic block diagram showing construction of the noise suppressing means in the solid-state imaging apparatus according to the sixth embodiment.

A sixth embodiment of the invention will now be described. FIG. 16 is a schematic block diagram showing construction of the noise suppressing means in the solid-state imaging apparatus according to the sixth embodiment.

The noise suppressing means according to the sixth embodiment has construction combining a noise suppressing means according to the fourth embodiment shown in FIG. 14 and a noise suppressing means according to the fifth embodiment shown in FIG. 15. SNR can be improved with such construction, since the amplification noise and quantization noise of A/D converter in appearance is relatively small. It is thereby possible with a minimum acquisition of noise signal to always read a noise signal with less random noise component in a manner always following dark current component of the memory section that occurs for example due to temperature change. Accordingly, a shortest photographing interval is achieved to improve speed of successive photographing, contributing to reduction in power consumption, and an equivalent advantage is obtained also for the previously described processing of image quality improvement.

While, in the above embodiments, A/D conversion is effected by A/D converter 32 on the output from the horizontal circuit 31, it is naturally also possible to obtain an equivalent advantage with a construction where A/D conversion is effected correspondingly to each column within the horizontal circuit 31.

What is claimed is:

1. A solid-state imaging apparatus comprising:
a pixel section having two-dimensionally arrayed pixels each having a photoelectric conversion means, a memory means for storing photoelectric conversion signal of said photoelectric conversion means, a transfer means for transferring said photoelectric conversion signal to said memory means, a reset means for resetting said memory means, a discharge means for discharging photoelectric conversion signal accumulated at said photoelectric conversion means, and a read means for reading photoelectric conversion signal of said memory means;
an A/D converter for converting a pixel signal outputted from said pixel section into a digital signal;
a noise suppressing means for suppressing noise of signal from said A/D converter, having a frame memory for storing signals from said A/D converter, and an adder for adding an output from said frame memory and signal from said A/D converter; and
a controller for, in reading signal from the same one pixel of said pixel section, effecting control so that there is a difference corresponding to one frame period between timing at which a first signal level of said pixel after transfer of said photoelectric conversion signal to said memory means by said transfer means is read out and timing at which a second signal level of said pixel at the time of resetting said memory means by said reset means is read out.

2. The solid-state imaging apparatus according to claim 1, wherein said controller comprises:
a control where photoelectric conversion signals accumulated at said photoelectric conversion means are discharged concurrently for all pixels and the discharging operation is then stopped to start an exposure period;
a control where said memory means is sequentially reset one line or a plurality of lines at a time so that reset levels corresponding to one frame are read out and inputted to said noise suppressing means;
a control where, after completion of readout of said reset levels, photoelectric conversion signals accumulated at said photoelectric conversion means are transferred concurrently for all pixels to said memory means to end an exposure; and
a control where signal levels corresponding to one frame are sequentially read out one line or a plurality of lines at a time from said memory means and are inputted to said noise suppressing means.

3. The solid-state imaging apparatus according to claim 2, wherein said controller stops the discharging operation of photoelectric conversion signals accumulated at said photoelectric conversion means to start an exposure during readout of reset levels when the exposure period is shorter than a period for reading reset levels corresponding to one frame, and stops the discharging operation of photoelectric conversion signals accumulated at said photoelectric conversion means to start the exposure before readout of reset levels when the exposure period is longer than the period for reading reset levels corresponding to one frame.

4. The solid-state imaging apparatus according to claim 2, wherein said controller starts to read said reset Levels corresponding to one frame substantially one frame period before a point in time when photoelectric conversion signals accumulated at said photoelectric conversion means are transferred concurrently for all pixels to said memory means.

5. The solid-state imaging apparatus according to claim 1, wherein said controller is made to be capable of switching between:
a first read mode where, after sequentially resetting said memory means one line or a plurality of lines at a time and reading reset levels immediately after reset corresponding to one frame, reset levels after passage of one frame period from the resetting of said memory means one line or a plurality of lines at a time are read out corresponding to one frame; and
a second read mode where, after sequentially resetting said memory means one line or a plurality of lines at a time and reading reset levels immediately after reset corresponding to one frame, photoelectric conversion signals accumulated at said photoelectric conversion means are transferred concurrently for all pixels to said memory means, and signal levels corresponding to one frame are sequentially read out therefrom one line or a plurality of lines at a time.

6. The solid-state imaging apparatus according to claim 5, wherein said controller effects operation of said second read mode after effecting operation of said first read mode one time or a plurality of times.

7. The solid-state imaging apparatus according to claim 5, wherein said controller effects operation of said first read mode one time or a plurality of times after effecting operation of said second read mode.

8. The solid-state imaging apparatus according to claim 5, wherein said controller effects operation of said second read mode after effecting said first read mode one time or a plurality of times, and further effects operation of said first read mode one time or a plurality of times.

9. The solid-state imaging apparatus according to claim 6, wherein said noise suppressing means detects a noise signal by subtracting in digital signal condition a reset level immediately after reset from a reset level after passage of one frame period read out by operation of said first read mode, detects an optical signal by subtracting in digital signal condition a reset level immediately after reset from a signal level read out by operation of said second read mode, and after effecting an averaging processing used a plurality of noise signals obtained by operation of said first read mode, subtracts in digital signal condition the noise signal after subjected to said averaging processing from the optical signal obtained by operation of said second read mode.

10. The solid-state imaging apparatus according to claim 7, wherein said noise suppressing means detects a noise signal by subtracting in digital signal condition a reset level immediately after reset from a reset level after passage of one frame period read out by operation of said first read mode, detects an optical signal by subtracting in digital signal condition a reset level immediately after reset from a signal level read out by operation of said second read mode, and after effecting an averaging processing used a plurality of noise signals obtained by operation of said first read mode, subtracts in digital signal condition the noise signal after subjected to said averaging processing from the optical signal obtained by operation of said second read mode.

11. The solid-state imaging apparatus according to claim 8, wherein said noise suppressing means detects a noise signal by subtracting in digital signal condition a reset level immediately after reset from a reset level after passage of one frame period read out by operation of said first read mode, detects an optical signal by subtracting in digital signal condition a reset level immediately after reset from a signal level read out by operation of said second read mode, and after effecting an averaging processing used a plurality of noise signals obtained by operation of said first read mode, subtracts in digital signal condition the noise signal after subjected to said averaging processing from the optical signal obtained by operation of said second read mode.

12. The solid-state imaging apparatus according to claim 6, wherein operation of said second read mode is effected for a plurality of times.

13. The solid-state imaging apparatus according to claim 7, wherein operation of said second read mode is effected for a plurality of times.

14. The solid-state imaging apparatus according to claim 8, wherein operation of said second read mode is effected for a plurality of times.

15. The solid-state imaging apparatus according to claim 5 further comprising a variable gain means for, provided between said pixel section and said A/D converter, effecting gain processing in analog signal condition to the reset level or signal level read out by operation of said first read mode and operation of said second read mode.

16. The solid-state imaging apparatus according to claim 15, wherein said variable gain means sets the gain for the reset level read out by operation of said first read mode to be higher than the gain for the reset level and signal level read out by operation of said second read mode.

17. The solid-state imaging apparatus according to claim 15, wherein, when said variable gain means sets the gain for the reset level read out by operation of said first read mode to be different from the gain for the reset level and signal level read out by operation of said second read mode, said noise suppressing means corrects the difference in gains before the subtraction processing in digital signal condition between an optical signal and noise signal.

18. The solid-state imaging apparatus according to claim 5 further comprising a two-stage shutter release means, wherein said controller effects one time or a plurality of times operation of the first read mode at the time of the shutter release operation of a first stage of said shutter release means, and, at the time of the shutter release operation of a second stage, stops the discharging operation and effects operation of the second read mode one time or a plurality of times.

19. The solid-state imaging apparatus according to claim 7 further comprising a shutter release means, wherein, when a shutter release operation is effected during operation of said first read mode being effected one time or a plurality of times after effecting operation of said second read mode, said controller once interrupts the operation of said first read mode, stops the discharging operation and effects operation of said second read mode one time or a plurality of times, and effects again operation of said first read mode one time or a plurality of times.

20. The solid-state imaging apparatus according to claim 8 further comprising a shutter release means, wherein, when a shutter release operation is effected during operation of said first read mode being effected one time or a plurality of times after effecting operation of said second read mode, said controller once interrupts the operation of said first read mode, stops the discharging operation and effects operation of said second read mode one time or a plurality of times, and effects again operation of said first read mode one time or a plurality of times.

21. The solid-state imaging apparatus according to claim 5, wherein said noise suppressing means detects a noise signal by subtracting in digital signal condition the reset level immediately after reset from the reset level after passage of one frame period read out by operation of said first read mode and stores the noise signal to a frame memory, giving weights respectively to a subsequently obtained noise signal and the noise signal stored at said frame memory, storing an operation result thereof afresh to the frame memory, and, when an optical signal is detected, subtracting in digital signal condition the signal stored at said frame memory from the optical signal.

22. The solid-state imaging apparatus according to claim 21, wherein said noise suppressing means makes said weights variable according to at least one of temperature and elapsed time.

23. The solid-state imaging apparatus according to claim 5, wherein said controller makes the number of times of operation of said first read mode variable according to at least one of temperature, successive picture taking mode, image quality mode, and optional setting by user.

* * * * *